US006898664B2

(12) United States Patent
Matthews et al.

(10) Patent No.: US 6,898,664 B2
(45) Date of Patent: May 24, 2005

(54) OPTIMIZING PERFORMANCE FOR A STORAGE DEVICE WITHIN A COMPUTER SYSTEM

(75) Inventors: Randy J. Matthews, Boise, ID (US);
Marc E. LeFevre, Boise, ID (US);
Richelle L. Ahlvers, Eagle, ID (US);
Wade A. Dolphin, Eagle, ID (US);
Douglas L. Voigt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 10/233,107

(22) Filed: Aug. 28, 2002

(65) Prior Publication Data

US 2004/0044846 A1 Mar. 4, 2004

(51) Int. Cl.[7] .............................................. G06F 12/00
(52) U.S. Cl. ...................... 711/112; 711/113; 711/114; 710/5; 710/6; 710/52; 710/56; 710/57; 710/60; 710/305; 710/310; 709/105; 709/314; 709/326
(58) Field of Search .................. 711/112–114; 710/5–6, 710/52, 56, 57, 60, 305, 310; 709/105, 314, 326

(56) References Cited

U.S. PATENT DOCUMENTS

| 5,150,279 | A  |   | 9/1992  | Collins et al. |
| 5,249,271 | A  | * | 9/1993  | Hopkinson et al. ........... 710/57 |
| 5,426,736 | A  | * | 6/1995  | Guineau, III ................ 710/56 |
| 5,623,598 | A  |   | 4/1997  | Voigt et al. |
| 6,178,460 | B1 |   | 1/2001  | Maddalosso et al. |
| 6,330,687 | B1 |   | 12/2001 | Griffith |
| 6,385,673 | B1 | * | 5/2002  | DeMoney .................... 710/60 |
| 6,622,206 | B1 | * | 9/2003  | Kanamaru et al. .......... 711/113 |
| 2003/0023815 | A1 | * | 1/2003 | Yoneyama et al. ......... 711/133 |

FOREIGN PATENT DOCUMENTS

| JP | 11191037 A | * | 7/1999 | ........... G06F/12/08 |

* cited by examiner

Primary Examiner—Donald Sparks
Assistant Examiner—Bao Q. Truong

(57) ABSTRACT

A data storage device may be constructed with a disk array; an array controller for controlling the array; and a queue for queuing commands from a host system to the disk array. Programming installed on the array controller adjusts a logical size of the queue to optimize performance.

34 Claims, 3 Drawing Sheets

OPTIMIZING PERFORMANCE FOR A STORAGE DEVICE WITHIN A COMPUTER SYSTEM

FIELD OF THE INVENTION

The present invention relates to the field of computer systems, and more particularly, the present invention provides a means and method of balancing the demands of a host device with the capacity of a data storage device.

BACKGROUND OF THE INVENTION

Computer systems typically include one or more computers, referred to as hosts. Where multiple computers are used, the computers are interconnected by a network that allows them to share data. Typically, such networks also include one or more data storage devices to provide additional data storage capacity for the networked computers. A common data storage device is a disk array, also sometimes referred to as a Redundant Array of Independent (or Inexpensive) Disks (RAID). A disk array is two or more hard drives or similar disks that provide data storage for connected hosts.

Computer systems operate optimally when all components in the system strike an equal balance of performance. Host systems and the attached storage should normally be balanced so that the ability of the storage to satisfy host requests is roughly equivalent to the workload generated by the host. In more complex configurations, many hosts can be transferring data to and from one or more storage devices. When more than one host is accessing a single storage device, it is important that the storage device be able to accommodate the performance demands of all the attached hosts. If the storage device is significantly less capable than the hosts from a performance perspective, the storage can be a limiting factor in overall system performance.

Fibre channel (FC) technology is a technology for connecting or networking host devices and storage devices. Fibre channel technology allows configurations that can include thousands of hosts connected to a single storage device. Fiber channel uses the Small Computer Systems Interface (SCSI) protocol, e.g., the SCSI-3 communication protocol. Consequently, each of the thousands of potential hosts can address up to 65,536 logical storage units (LUNs) within a disk array. Disk arrays that communicate using Fibre channel technology are shipping today with the ability to create thousands of LUNs.

Disk array configurations vary from arrays that contain four or fewer drives to arrays that contain more than a hundred drives. Ultimately, the performance of a disk array is limited by the number of disks in the array. This is the case because all work is eventually passed through to the disks.

Clearly, Fibre channel technology invites users to attach large numbers of hosts to a single storage device. Large numbers of hosts can direct huge amounts of work toward a storage device, such as a disk array. Consequently, users in such an environment may be accustomed to working with enterprise disk arrays that include hundreds of disks and are, therefore, capable of the performance required to support large numbers of hosts.

In a high demand environment, each host may have multiple input/output (I/O) requests to multiple LUNs at any given time. Each such request will have to be queued until processed—or rejected because the queue is full.

System performance is a complex topic that has been studied extensively. Given the number of performance factors and permutations, it can be very difficult, if not impossible, for users to know at the point of design if the workload that will be generated by their host/application configuration will exceed the ability of their storage systems. Therefore, it is not uncommon for users to set up systems that are not balanced with storage performance.

In one unbalanced system, the user might have storage performance capability that significantly exceeds the workload generated by the attached hosts. The user might be dissatisfied with the performance of the whole solution and may need to add more host capacity to achieve the desired performance result.

The present invention addresses the complementary scenario where the host/application workload exceeds the ability of the attached storage. As used herein, the term "over-configuration" is used to describe the scenario where host/application performance needs exceed the storage performance capabilities. Another way of stating this is that the system designer has under-provisioned the storage for the needs of the overall solution.

Over-configured systems can lead to more serious problems than dissatisfaction. In the case where the data storage array is not capable of meeting system performance requirements, the response times of user applications will become unacceptably high. In the more extreme cases, the symptoms can include catastrophic events like application failure, server crashes and host cluster failures. These catastrophic events occur because the software in the host (drivers, applications, volume managers) limit the amount of time they will wait for storage devices to complete requests. When the response time of the storage device, e.g., a disk array, exceeds the limit enforced by the host software, catastrophic events can occur. Clearly, there is a need for ways to detect over-configuration and to avoid over-configuration entirely.

Presently, users discover over-configuration problems through trial and error. The discovery often results from a support request where support personnel are only able to guess that a system is operating in an unbalanced state. This is a reactive solution that focuses on telling users how to avoid these unbalanced configurations rather than how to detect and mitigate performance problems as they arise.

Because of the complexity and dynamic nature of performance, this can be a very error prone process. Unbalanced configurations are very common. Once the unbalanced configuration is setup, users must first establish that performance of the whole system is unacceptable. Users identify a poorly performing system through a variety of tools that provide clues. However, the process always includes a manual examination of the configuration, the applications and many other pieces of information obtained from a variety of sources. The process inevitably ends with a heuristic analysis by an expert who concludes that the system is unbalanced. Given this conclusion, the next step is to add more storage and hope that the performance problems are resolved.

In general, when an I/O request is sent to a storage device it is either accepted or rejected. Requests that are accepted are placed in a service queue to await further processing. When the ability of the storage device to capture and queue new requests is exceeded, the request is rejected and the request is returned to the host system with a status of queue full (QFULL). Though QFULL is the appropriate return status for this condition, some storage devices return BUSY rather than QFULL. This is important in that host system drivers will typically display different retry behaviors for BUSY and QFULL conditions.

A storage device could make its service queue so large that QFULL events could not occur, but this solution also has limitations. Service queue size is limited in a practical sense by the timeout periods enforced by host system drivers and applications. In order to ensure that storage devices do not cause applications to wait forever, host system drivers and some software applications enforce timeouts on I/O requests. If a request times out, the host assumes the storage device is having some problem. To recover from this condition, the host system instructs the storage to abort the I/O and then retries the request (up to some finite number of retries).

If the number of I/O requests queued is large enough, the latency in processing the requests can exceed the timeout limit imposed by the host system drivers and/or host system applications. These timeouts occur simply because the storage device cannot process the number of requests in the service queue in the allowed time. For this reason, there is a practical limitation on the size of storage device service queues.

Host reactions to both QFULL events and timeouts are expensive in terms of performance. In fact, both events can propagate through the system and result in real or perceived failures. Both events are treated as error cases in host code (i.e., in fibre channel drivers). Often these events show up in host system logs where they may be treated as critical failures. This interpretation may or may not be accurate depending on other behavior.

The handling of QFULL and timeout events leaves the storage device designer with a dilemma. On the one hand, it is desirable to maximize the size of the storage service queue. A larger queue means more hosts can be connected. This improves the connectivity of the array without resulting in unnecessary QFULL events. If the I/O request characteristics of the hosts and applications are appropriate, it might be possible to construct a balanced system with a large number of hosts, even to a relatively slow storage device. On the other hand, the storage device designer wants to keep the queue size small enough that even large configurations with the worst-case access patterns can be accommodated without timeout events occurring. Obviously, it has been extremely difficult in the past for a system designer to try to balance these competing considerations.

SUMMARY OF THE INVENTION

In one of many possible embodiments, the present invention provides a data storage device that includes a disk array, an array controller for controlling the array, and a queue for queuing commands from a host system to the disk array. Programming, e.g., firmware, installed on the array controller adjusts a logical size of the queue to optimize performance.

Another embodiment of the present invention also provides a method of optimizing performance within a computer system that includes at least one host device and at least one data storage device, the method comprising adjusting a logical size of a queue of the data storage device.

Another embodiment of the present invention also provides a computer system that includes at least one host device, at least one data storage device, and a network connecting the at least one host device and the at least one data storage device. The data storage device includes a disk array, an array controller for controlling the array, and a queue for queuing commands from a host system to the disk array. Programming installed on the array controller adjusts a logical size of the queue to optimize performance.

Another embodiment of the present invention also provides a method of optimizing performance in a computer system that includes at least one host device, at least one data storage device, and a network connecting the at least one host device and the at least one data storage device, wherein the at least one data storage device comprises a disk array, an array controller for controlling the array, and a queue for queuing commands from a host system to the disk array. The method includes adjusting a logical size of the queue in response to demands on the at least one data storage device imposed by the at least one host device.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION OF THE PREFERRED EMBODIMENTS

The present invention introduces new array queue mechanisms that allow the user and support personnel to make the best choice for the system with respect to queue size and response times. Firmware or other programming for storage devices, according to principles of the present invention, allows support personnel to dynamically modify the size of the array's service queue while the system is in operation. Changes will be reflected almost instantaneously.

Figure 1:
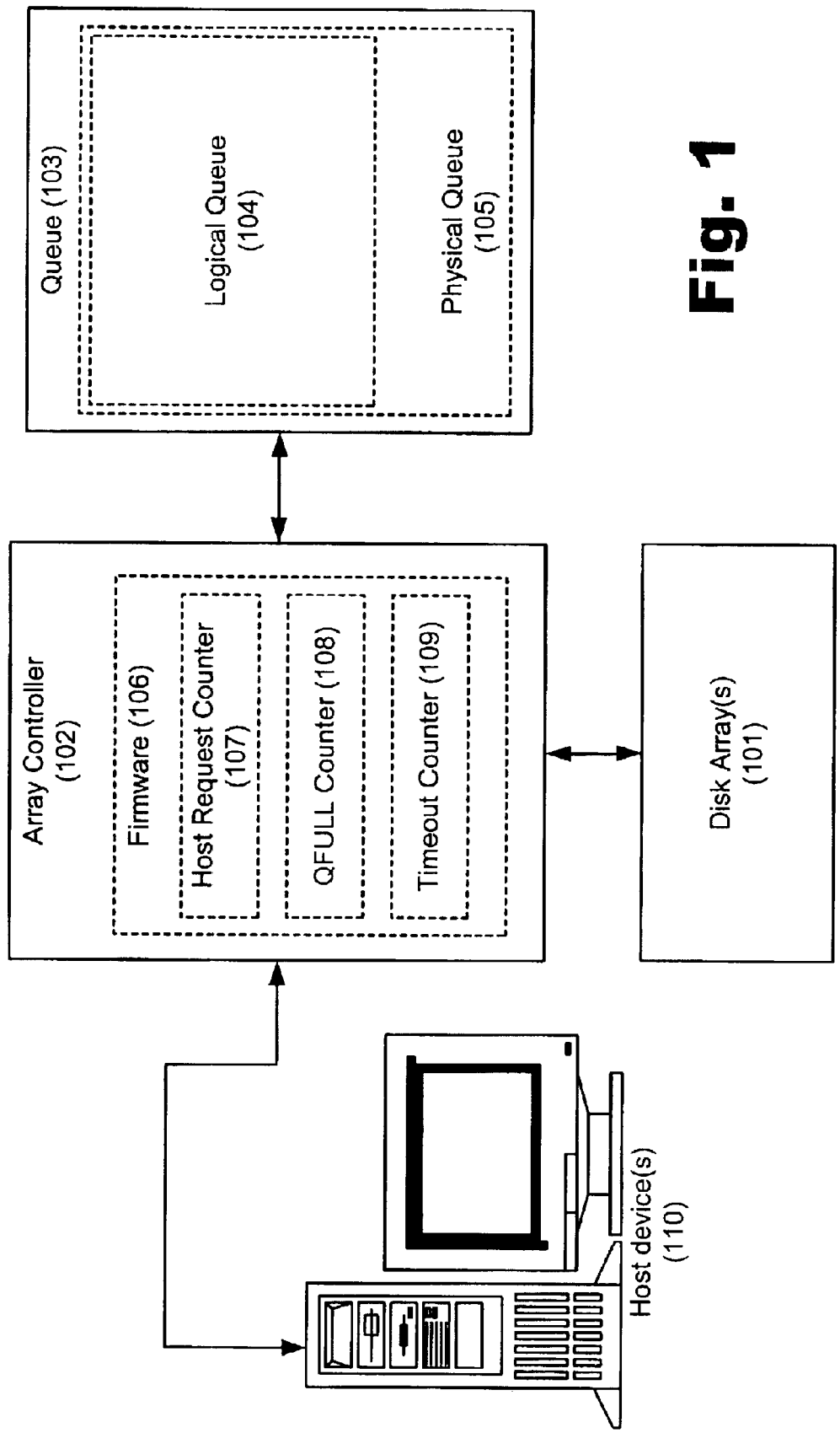
FIG. 1 is a block diagram illustrating an improved computer system according to an embodiment of the present invention, where the system includes at least one host device and at least one data storage device having an adjustable queue.

FIG. 1 is a block diagram illustrating an improved computer system with host devices and data storage devices according to an embodiment of the present invention. As used herein and in the appended claims, the term "storage device" is used to refer to any data storage device, including, but not limited to, a disk array, a disk drive, a tape drive or any SCSI or fibre channel device. As shown in FIG. 1, an exemplary system includes one or more host devices (110) that are connected to a data storage device that includes one or more disk arrays (101).

The array(s) (101) are controlled by an array controller (102). The controller (102) receives I/O requests from the host devices (110) and controls the arrays (101) to respond to those requests. The controller (102) queues host requests in a queue (103) until they can be handled. The various host devices (110) submit requests to this single, common queue.

Under principles of the present invention, the physical size of the queue (105) is separated from the logical size of the queue (104). The physical size of the queue (105) is set to accommodate the largest supported logical queue size (104) at the time that the firmware, software or other programming (hereinafter "firmware") (106) is installed in the array controller (102). The logical queue size (104) is the number of host I/O requests that the queue (103) will store before returning a QFULL event to the host (110). The logical queue size (104) can be adjusted dynamically on a running system by the firmware (106) in the controller (102) to a maximum of the physical queue size (105). The algorithm in the firmware (106) is preferably structured so as to prevent attempts to increase the logical queue size (104) beyond the physical queue size (105).

Disk array firmware (106), according to the present invention, also introduces three event counters which track and log queue performance information that can be used to diagnose and tune the storage system. The counters track the number of host requests (107), QFULL events (108) and timeout events (109) that the storage device has encountered. In practice, the storage device can count timeout events indirectly by counting the number of times the device was told to abort a request. The assumption is made that the vast majority of aborts occur as a result of timeout events.

Users and support team members can use the information captured by these counters (107–109) of the storage device in conjunction with the adjustable logical queue size (104) to tune their system for workload performance. The goal is to find a logical queue size (104) large enough to virtually eliminate QFULL events while at the same time small enough to minimize timeout events. It is not practical to seek to completely eliminate QFULL events or timeouts. Even in healthy well-balanced computer systems QFULL events and timeouts may occur as a result of infrequent or anomalous events (such as an unexpected spike in workload).

The goal should more precisely be to manipulate the logical queue size (104) to minimize two ratios, the ratio of QFULL events to the number of host requests (the QFULL rate) and the ratio of timeout events to the number of host requests (the timeout rate). The goal will be to find a logical queue size (104) that drives both the QFULL rate and the timeout rate to near zero.

Figure 2:
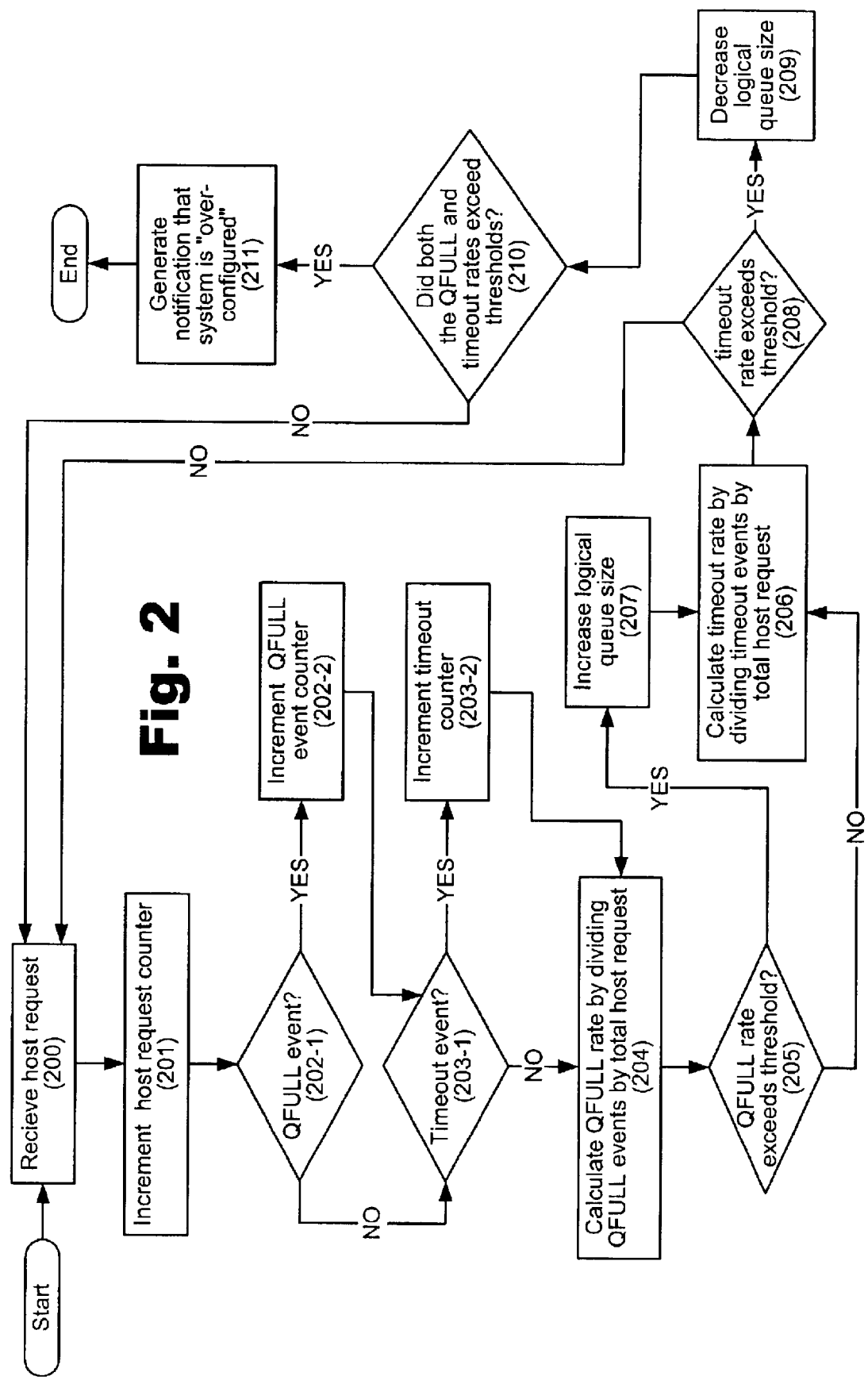
FIG. 2 is a flowchart illustrating a method of operating a computer system with host devices and data storage devices according to an embodiment of the present invention.

FIG. 2 is a flowchart illustrating a method of operating a computer system with host devices and data storage devices according to an embodiment of the present invention. As shown in FIG. 2, the process for optimizing logical queue size attempts to minimize or drive toward zero both the QFULL rate and the timeout rate.

First, the counters of the controller firmware count host requests. For each host request received (200), a host request counter is incremented (201). If the host request elicits a QFULL event (202-1), a QFULL event counter is incremented (202-2). Similarly, if the host request is not processed and elicits a timeout event (203-1), a timeout counter is incremented (203-2).

Next, the QFULL rate is calculated by dividing the number of QFULL events by the current number of host requests received (204). This QFULL rate is then compared to a threshold (205). In an ideal system, this threshold would be zero, but may be set higher in a real system. If the QFULL rate exceeds the acceptable threshold (205), the algorithm will increase the logical queue size (207). This will tend to decrease the number of QFULL events by providing additional queue capacity.

Next the timeout rate is calculated by dividing the number of timeout events by the current number of host requests received (206). Again, in an ideal system, this threshold would be zero, but will likely be higher in an actual system. If the timeout rate exceeds the acceptable threshold (208), the algorithm will decrease the logical queue size (209). This will tend to prevent timeout events by limiting the number of requests waiting for execution.

If both ratios exceed their respective thresholds (210), the storage device is not capable of accommodating the host workload being generated. This may be a temporary condition due to an abnormally high host workload. However, if this state persists, the system is probably over-configured. In such a case, the firmware may generate a notification (211) for the system administrator that the system may be over-configured. The system administrator can then consider corrective action. The correct response might be to increase the capability of the disk array (by adding cache, array controllers or disks) or to simply add another disk array.

The prior discussion focuses on the queue for the disk array or other storage device. However, host requests also traverse queues within the host itself. The host drivers and host bus adapters (HBAs) also process requests in their own internal queues. It is important to understand the algorithms used within the host since those queues can also be making dynamic adjustments under the principles of the present invention.

Command service queues are used in storage devices as a means of managing I/O requests. The service queue needs to be large enough to handle the typical load as well as accommodating the less frequent, shorter periods of high demand. If the array's I/O processing rate meets or exceeds the host's I/O request rate, the service queue utilization will remain static or diminish over time. If the host's I/O request rate exceeds the rate at which the array can process the requests, the service queue level will grow until the queue capacity is consumed.

A disk array in a complex Storage Area Network (SAN) environment will have requests posted by multiple hosts. Each of these hosts can send a burst of requests. The term "burst" as used here means that the number of requests is fixed and that the requests are delivered at a rate that exceeds the array's ability to process requests. Thus, a burst of requests will result in an increase in the demands on the array's service queue. Each host will limit the size of the bursts that it sends according to the command queuing limits that are imposed by the host bus adapter (HBA) drivers.

In a busy environment, the typical behavior exhibited by a host is for the host to send a burst of requests (host queue limited) and then wait for those requests to be processed by the array. As the array processes those requests, the host side command queue diminishes, enabling the host to send more requests. Tactics that involve reducing the host side command queue size can minimize the numbers of commands that are rejected with QFULL return status.

In the real world, just as the host request rate is not constant, the array's I/O processing rate is not constant either. As described above, under principles of the present invention, the storage device allows for the service queue limit value to be adjusted to suit the needs of the system. Additionally, the command queue on the host device or devices can also be adjusted to suit the needs of the system.

Figure 3:
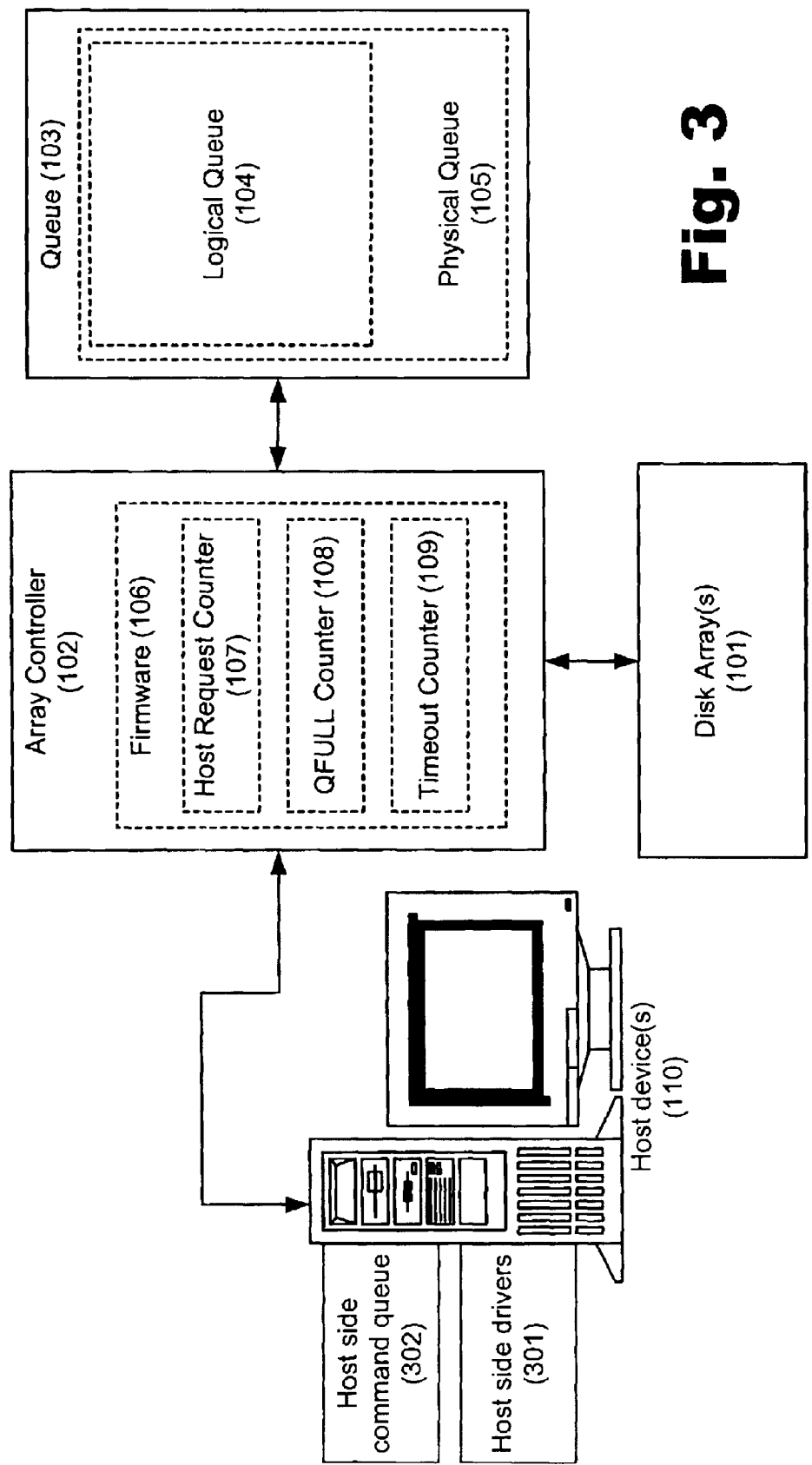
FIG. 3 illustrates a computer system according to another embodiment of the present invention, where the system includes at least one host device and at least one storage device and where the size of the command queue in the host device(s) can be adjusted to better equalize the system.

FIG. 3 illustrates a system according to another embodiment of the present invention. This system includes at least one host device and at least one storage device where the size of the command queue in the host device(s) can be adjusted to better equalize the system.

For example, suppose a particular disk array (101) with a queue (103) has a logical size (104) of 750 commands. Despite this capacity, the queue depth of this particular disk array, or the demand placed on the queue (103) by the attached host devices (110), is discovered to be at about 100 commands during normal operation, with moderate numbers of commands are taking more than 0.2 seconds to complete.

In this example, the logical queue size (104) may be changed from the default of 750 commands to the actual usage figure of 100 commands to prevent the array (101) from having its' command latency curve broadened further. If the hosts (110) then become more active, the array controller (102) will respond by rejecting the commands resulting from this additional exuberance with a QFULL status indication.

Under the principles of the present invention, the host drivers (301) will preferably respond by decreasing the host side command queues (302). This will decrease the rate of commands being sent from the host (110) to the storage device (101–103).

After equilibrium is reached, the array (101) will be processing commands at the same command latency levels as before the workload was increased. On the host side, the blocking nature of the system call interface will force the application to keep the request rate at the level governed by the "queue full threshold" setting. This scenario keeps the response time at the desired level, but increases the minimum time between requests. This increase in time between requests is a manifestation that most users will not be happy with in the long run. A better solution is to add more storage processing capability to the configuration.

This "queue full threshold" adjustment may also be used to impact the rate at which the longer driver related timeouts occur. Suppose that for a particular workload the storage device (101–103) is observed to have a logical queue depth of 400 commands while the Operating System (O/S) drivers (301) are reporting timeout events at the rate of 1 every 5 seconds. The logical size of the queue (104) is then preferably decreased to 300 in order to shorten the tail of the command latency distribution.

The array controller (102) will now reject large numbers of commands with a QFULL status. Preferably, the host side driver (301) will respond to the QFULL status by reducing the depth of the host side queue (302) until the QFULL return status ceases. Since the storage device (101–103) is now operating with a shorter command queue (104), the rate of commands with significant latency, e.g., 30 seconds, should be significantly reduced.

The host side driver (301) will, from time to time, probe the storage device (101–103) by once again increasing the depth of the host side command queue (302). When this happens, QFULL responses will result until the host side driver (301) decides to reduce the depth of the host side queue (302) once again.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best illustrate the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A data storage device comprising:
   a disk array;
   an array controller for controlling said disk array; and
   a queue for queuing commands from a host system to said disk array;
   wherein programming installed on said array controller adjusts a logical size of said queue in response to a number of QFULL events.

2. The data storage device of claim 1, wherein said programming adjusts said logical size of said queue in response to both said number of QFULL events and a number of timeout events.

3. The data storage device of claim 2, wherein said programming adjusts said logical size of said queue so as to minimize both said number of QFULL events and said number of timeout events.

4. The data storage device of claim 2, wherein said programming adjusts said logical size of said queue so as to minimize a ratio of said number of QFULL events to a number of host requests and so as to minimize a ratio of said number of timeout events to said number of host requests.

5. A data storage device comprising:
   a disk array;
   an array controller for controlling said array; and
   a queue for queuing commands from a host system to said disk array;
   wherein programming installed on said array controller adjusts a logical size of said queue; and
   wherein said programming further comprises:
   a host request counter;
   a QFULL event counter; and
   a timeout event counter.

6. The data storage device of claim 5, wherein:
   said programming determines a QFULL rate by dividing a total number of QFULL events that have occurred by a current number of host requests received; and
   said programming increases said logical size of said queue if said QFULL rate exceeds a pre-determined threshold.

7. The data storage device of claim 5, wherein:
   said programming determines a timeout rate by dividing a total number of timeout events that have occurred by a current number of host requests received; and
   said programming decreases said logical size of said queue if said timeout rate exceeds a pre-determined threshold.

8. A method of optimizing performance within a computer system that includes at least one host device and at least one data storage device, said method comprising adjusting a logical size of a queue of said data storage device in response to a number of QFULL events.

9. The method of claim 8, further comprising adjusting said logical size of said queue in response to both said number of QFULL events and a number of timeout events.

10. The method of claim 9, further comprising adjusting said logical size of said queue so as to minimize both said number of QFULL events and said number of timeout events.

11. The method of claim 9, further comprising adjusting said logical size of said queue so as to minimize a ratio of said number of QFULL events to a number of host requests and so as to minimize a ratio of said number of timeout events to said number of host requests.

12. A method of optimizing performance within a computer system that includes at least one host device and at least one data storage device, said method comprising:
adjusting a logical size of a queue of said data storage device;
counting host requests;
counting QFULL events; and
counting timeout events.

13. The method of claim 12, further comprising:
calculating a QFULL rate by dividing a total number of QFULL events that have occurred by a current number of host requests received; and
increasing said logical size of said queue if said QFULL rate exceeds a pre-determined threshold.

14. The method of claim 13, further comprising:
calculating a timeout rate by dividing a total number of timeout events that have occurred by a current number of host requests received; and
decreasing said logical size of said queue if said timeout rate exceeds a pre-determined threshold.

15. The method of claim 14, further comprising generating a notification that said computer system is over-configured if both said QFULL rate and said timeout rate exceed said respective pre-determined thresholds.

16. The method of claim 15, further comprising adding additional storage capacity to said data storage device.

17. The method of claim 12, further comprising:
calculating a timeout rate by dividing a total number of timeout events that have occurred by a current number of host requests received; and
decreasing said logical size of said queue if said timeout rate exceeds a pre-determined threshold.

18. A system for optimizing performance within a computer system comprising:
at least one host device;
at least one data storage device having a queue for receiving commands from said at least one host device; and
means for adjusting a logical size of a queue of said at least one data storage device in response to a number of QFULL events.

19. The system of claim 18, wherein said means for adjusting adjust said logical size of said queue in response to both said number of QFULL events and a number of timeout events.

20. The system of claim 19, wherein said means for adjusting adjust said logical size of said queue so as to minimize both said number of QFULL events and said number of timeout events.

21. The system of claim 19, wherein said means for adjusting adjust said logical size of said queue so as to minimize a ratio of said number of QFULL events to a number of host requests and so as to minimize a ratio of said number of timeout events to said number of host requests.

22. A system for optimizing performance within a computer system comprising:
at least one host device;
at least one data storage device having a queue for receiving commands from said at least one host device;
means for adjusting a logical size of a queue of said data storage device; and
means for counting host requests;
means for counting QFULL events; and
means for counting timeout events.

23. The system of claim 22, further comprising:
means for calculating a QFULL rate by dividing a total number of QFULL events that have occurred by a current number of host requests received; and
means for increasing said logical size of said queue if said QFULL rate exceeds a pre-determined threshold.

24. The system of claim 22, further comprising:
means for calculating a timeout rate by dividing a total number of timeout events that have occurred by a current number of host requests received; and
means for decreasing said logical size of said queue if said timeout rate exceeds a pre-determined threshold.

25. A computer system comprising:
at least one host device;
at least one data storage device; and
a network connecting said at least one host device and said at least one data storage device;
wherein said at least one data storage device comprises;
a disk array,
an array controller for controlling said disk array, and
a queue for queuing commands from a host system to said disk array,
wherein programming installed on said array controller adjusts a logical size of said queue in response to a number of QFULL events.

26. A computer system comprising:
at least one host device;
at least one data storage device; and
a network connecting said at least one host device and said at least one data storage device;
wherein said at least one data storage device comprises:
a disk array,
an array controller for controlling said array, and
a queue for queuing commands from a host system to said disk array,
wherein programming installed on said array controller adjusts a logical size of said queue to optimize performance;
wherein said programming further comprises:
a host request counter;
a QFULL event counter; and
a timeout event counter.

27. The computer system of claim 26, wherein:
said programming determines a QFULL rate by dividing a total number of QFULL events that have occurred by a current number of host requests received; and
said programming increases said logical size of said queue if said QFULL rate exceeds a pre-determined threshold.

28. The computer system of claim 26, wherein:
said programming determines a timeout rate by dividing a total number of timeout events that have occurred by a current number of host requests received; and
said programming decreases said logical size of said queue if said timeout rate exceeds a pre-determined threshold.

29. A computer system comprising:
at least one host device;
at least one data storage device; and
a network connecting said at least one host device and said at least one data storage device;
wherein said at least one data storage device comprises;
a disk array, an array controller for controlling said array, and a queue for queuing commands from a host system to said disk array, wherein programming installed on said array controller adjusts a logical size of said queue to optimize performance;

further comprising:

a driver installed on said at least one host device; and a command queue on said at least one host device;

wherein said driver adjusts a size of said command queue on said host device in response to QFULL or timeout events on said at least one data storage device.

30. A method of optimizing performance in a computer system that includes at least one host device, at least one data storage device, and a network connecting said at least one host device and said at least one data storage device, wherein said at least one data storage device comprises a disk array, an array controller for controlling said array, and a queue for queuing commands from a host system to said disk array, said method comprising adjusting a logical size of said queue in response to demands on said at least one data storage device imposed by said at least one host device as determined by counting QFULL events.

31. A method of optimizing performance in a computer system that includes at least one host device, at least one data storage device, and a network connecting said at least one host device and said at least one data storage device, wherein said at least one data storage device comprises a disk array, an array controller for controlling said array, and a queue for queuing commands from a host system to said disk array, said method comprising:

adjusting a logical size of said queue in response to demands on said at least one data storage device imposed by said at least one host device;

counting host requests;

counting QFULL events; and counting timeout events.

32. The method of claim 31, further comprising:

calculating a QFULL rate by dividing a total number of QFULL events that have occurred by a current number of host requests received; and increasing said logical size of said queue if said QFULL rate exceeds a pre-determined threshold.

33. The method of claim 31, further comprising:

calculating a timeout rate by dividing a total number of timeout events that have occurred by a current number of host requests received; and decreasing said logical size of said queue if said timeout rate exceeds a pre-determined threshold.

34. A method of optimizing performance in a computer system that includes at least one host device, at least one data storage device, and a network connecting said at least one host device and said at least one data storage device, wherein said at least one data storage device comprises a disk array, an array controller for controlling said array, and a queue for queuing commands from a host system to said disk array, said method comprising:

adjusting a logical size of said queue in response to demands on said at least one data storage device imposed by said at least one host device; and adjusting a size of a command queue on said at least one host device in response to QFULL or timeout events on said at least one data storage device.

* * * * *